United States Patent [19]

Warchol et al.

[11] Patent Number: 4,479,542
[45] Date of Patent: Oct. 30, 1984

[54] ENHANCED OIL RECOVERY PROCESS UTILIZING A LIGNOSULFONATE AS A SOLUBILIZING AGENT IN AN AFTERFLUSH

[75] Inventors: Mark P. Warchol; Walter W. Gale, both of Houston, Tex.

[73] Assignee: Exxon Production Research Co., Houston, Tex.

[21] Appl. No.: 443,261

[22] Filed: Nov. 22, 1982

[51] Int. Cl.³ ............................................. E21B 43/22
[52] U.S. Cl. .................................................. 166/273
[58] Field of Search ............................... 166/273, 274; 252/8.55 D

[56] References Cited

U.S. PATENT DOCUMENTS

| | | | |
|---|---|---|---|
| 3,469,630 | 9/1969 | Hurd et al. | 166/273 X |
| 3,474,864 | 10/1969 | Hurd | 166/273 X |
| 3,478,823 | 11/1969 | Murphy | 166/274 |
| 3,482,631 | 12/1969 | Jones | 166/273 |
| 3,700,031 | 10/1972 | Germer, Jr. et al. | 166/273 X |
| 4,252,194 | 2/1981 | Felber et al. | 166/273 X |
| 4,271,906 | 6/1981 | Bousaid et al. | 166/273 |
| 4,276,933 | 7/1981 | Kudchadker et al. | 166/273 X |
| 4,313,500 | 2/1982 | Johnson, Jr. et al. | 166/273 |
| 4,384,997 | 5/1983 | Detroit | 166/274 X |

*Primary Examiner*—George A. Suchfield
*Attorney, Agent, or Firm*—James H. Riley; Michael A. Nametz

[57] ABSTRACT

To reduce the surfactant adsorption in a subterranean formation during a surfactant or microemulsion flooding process, lignosulfonate salts are injected into the formation after the surfactant solution has already been injected. The lignosulfonate afterflush may contain a thickener to promote better sweep efficiency, and water or brine will usually be used to drive the lignosulfonate salts through the reservoir to a production well.

12 Claims, 1 Drawing Figure

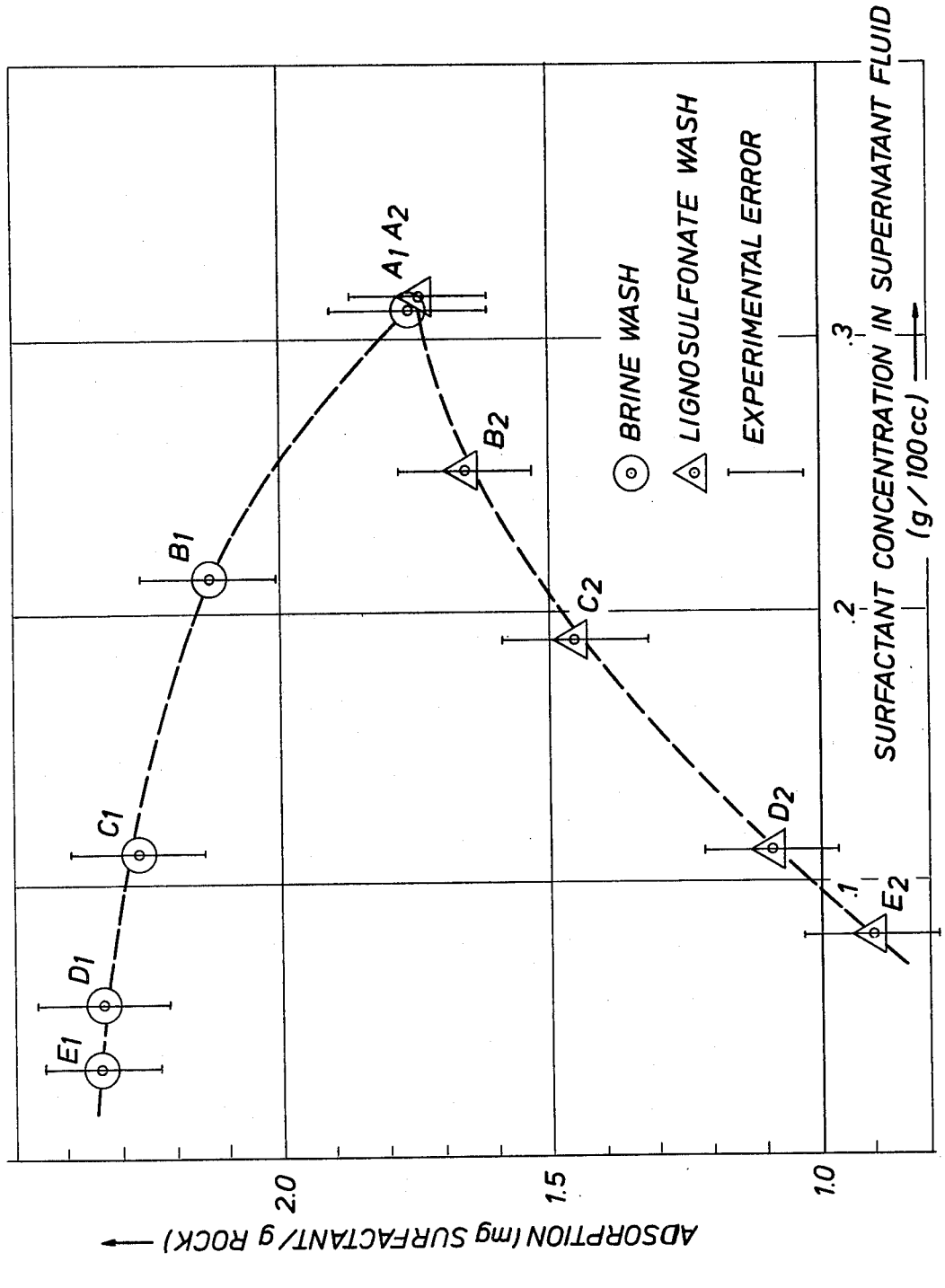
FIG.1 ADSORPTION OF ISO-TRIDECYL PROPOXYLATED, ETHOXYLATED SULFATE

ENHANCED OIL RECOVERY PROCESS UTILIZING A LIGNOSULFONATE AS A SOLUBILIZING AGENT IN AN AFTERFLUSH

BACKGROUND OF THE INVENTION

1. Field of the Invention

This invention relates to the recovery of oil from a subterranean formation. More specifically, this invention relates to an enhanced oil recovery process which utilizes surfactants.

2. Description of the Prior Art

The petroleum industry has recognized for many years that only a small fraction of the original oil in place in a reservoir is expelled by natural mechanisms. It is also well-known that conventional methods of supplementing natural recovery are relatively inefficient. Typically, a reservoir may retain half its original oil even after the application of currently available methods of secondary recovery. Accordingly, there is a continuing need for improved recovery methods which will substantially increase the ultimate yield of petroleum from subterranean reservoirs.

Waterflooding is by far the most widely practiced method for recovering oil from a formation after naturally occurring forces in the formation have declined in their ability to expel oil. In waterflooding, water is typically injected through an input well to drive oil to offset producing wells. Much of the current work in oil recovery technology has been directed toward improving the efficiency of waterflooding processes or developing alternative processes.

Surface-active agents or surfactants are one class of materials which have been proposed for improving the efficiency of waterflooding processes. Much of the oil that is retained in the reservoir after a typical waterflood is in the form of discontinuous globules or discrete droplets which are trapped within the pore spaces of the reservoir. Because the normal interfacial tension between the reservoir oil and water is so high, these discrete droplets are unable to sufficiently deform to pass through narrow constrictions in the pore channels. When surface-active agents are added to the flood water, they lower the interfacial tension between the water and the reservoir oil and permit the oil droplets to deform and flow with the flood water. It is generally conceded that the interfacial tension between the flood water and the reservoir oil must be reduced to less than 0.1 dyne/cm for additional recovery.

More recently, surfactants have been used advantageously in flooding with microemulsions or micellar dispersions. Microemulsions are stable, transparent or translucent mixtures of a liquid hydrocarbon, water and a surfactant. Optionally, a co-solvent (such as alcohol), cosurfactants, and electrolytes may be present in the mixture. A discussion of the properties of microemulsions may be found in the following references: R. N. Healy and R. L. Reed, "Multiphase Microemulsion Systems", *Society of Petroleum Engineers Journal*, pp. 147–160 (1976); and P. A. Winsor, "Solvent Properties of Amphiphilic Compounds", Butterworth's Scientific Publications, London (1954).

In practice, a microemulsion slug is typically injected into the formation, followed by an aqueous slug thickened with a polymer to provide a mobility buffer for improved sweep efficiency. The microemulsion and thickened aqueous slug are then displaced through the formation by flooding water to drive crude oil through the formation to one or more production wells for recovery.

Although flooding processes utilizing surfactants may be effective in obtaining additional oil from subterranean oil reservoirs, a number of shortcomings continue to detract from their value. One difficulty which has been observed in the use of surfactants in general is the tendency of the surfactants to be depleted from the injected solution. It has been demonstrated that at least a portion of the surface-active agents is adsorbed on the rock surface of the reservoir and a portion is physically entrapped within the pore spaces of the rock matrix. It is also known that many surfactants react with ionic substances in the water within the formation and are thereafter unable to interact at the oil/water interface to reduce the interfacial tension. The surfactant depletion can seriously reduce oil recovery efficiency.

A promising approach for reducing the amount of surfactant retained by the formation has been to use sacrificial compounds, usually in a preflush solution injected into the formation before injection of the surfactant-containing solution. The compounds are "sacrificial" in the sense that they become trapped in the formation thereby reducing retention of the more expensive surfactant contained in the trailing surfactant solution.

Lignosulfonates form one class of compounds which have been found to have excellent properties as sacrificial agents. They are economically attractive since being by-products of the pulping industry, they are plentiful and cost less than surfactants used in enhanced oil recovery methods. The use of various lignosulfonates has been disclosed extensively in the patent literature: U.S. Pat. Nos. 3,384,171; 4,133,385; 4,142,582; 4,157,115; 4,172,497; 4,172,498; 4,196,777; 4,252,194; and 4,271,906. While some of the earlier patents require that the formation be contacted with the lignosulfonates before injecting surfactant solution, later patents have suggested that it is preferable to inject lignosulfonates in admixture with the surfactant solution.

The '194 patent discloses a use for lignosulfonate other than as a sacrificial agent. It teaches a method for controlling the mobility of fluids during the injection process by using thickened lignosulfonates as a mobility buffer. Heating the lignosulfonates in excess of 200° F. for a sufficient period of time causes its viscosity to increase. It can then be used as the polymer flood slug during a micellar flooding process and as the polymer solution during a polymer flood or waterflood, but it does not function as a sacrificial agent.

The '906 patent involves using lignosulfonates as a sacrifical agent injected into the formation in the form of a plurality of separate, discrete slugs and alternating these injections with injections of similarly small slugs of surfactant solution. After all the slugs are injected, a viscous mobility buffer followed by drive water, is used to displace the fluids. This method does not disclose the use of lignosulfonates as an afterflush but is actually a more complicated variation of the admixture method.

While the use of lignosulfonates as preflushes or admixtures has, to some extent, reduced surfactant retention by a formation, other problems have arisen. For example, when lignosulfonates are used in a preflush solution, the length of time before any additional amount of oil is recovered will be increased since lignosulfonates, by themselves, will not recover oil. This can reduce the overall economics of the process. In addition, preflushes in general are often not as effective as expected because of the tremendous reservoir volumes. There is no assurance that the flow path of the surfactant solution will sufficiently coincide with that of the preflush.

In part, injecting lignosulfonates in admixture with surfactant mitigates these problems. However, yet other problems arise due to such admixture, especially where microemulsions are being used as the surfactant-containing liquid. These problems relate to chromatographic separation of the surfactant and lignosulfonate resulting in some of the same problems mentioned above. Furthermore, experience has shown that more complex mixing schemes tend to be subject to errors in the field.

SUMMARY OF THE INVENTION

The present invention provides an improved method of enhanced oil recovery utilizing surfactant solutions which reduces the extent of surfactant retention by a formation. Briefly, the method involves first injecting a surfactant solution into a reservoir via an injection well followed by the injection of a solution of lignosulfonate salts. The injected lignosulfonate salt solution may be termed an "afterflush" since it is required to be injected only after the surfactant solution has already been injected. Because it flows after the injected surfactant solution, many of the aforementioned problems with preflushes and admixtures are avoided. Indeed, because a surfactant solution tends to sweep out and define a high permeability flow path in the formation, the afterflush flow path tends to conform more closely to that of the surfactant solution. This is important for large reservoir volumes encountered in the field.

The afterflush may be injected as a slug following the injection of the surfactant solution. In addition to a lignosulfonate salt, the afterflush will contain a thickener so that it will also act as a mobility buffer to promote better sweep efficiencies. The surfactant solution will preferably be a microemulsion, although other systems which contain surfactants may be employed.

Following injection of both the surfactant solution and afterflush, water or brine usually will be injected to drive these liquids through the reservoir to a production well, thereby displacing crude oil for production from the well.

BRIEF DESCRIPTION OF THE DRAWINGS

FIG. 1 is a plot illustrating the reduction in surfactant adsorption for a lignosulfonate salt wash compared to a brine wash.

DETAILED DESCRIPTION OF THE INVENTION

In accordance with the present invention, a surfactant solution is injected into a reservoir via one or more injection wells. Subsequently, a thickened aqueous solution of lignosulfonate salts is injected as an afterflush. The afterflush serves to cause a substantial amount of surfactant which is adsorbed or otherwise retained by the formation to be mobilized. The mechanism for this phenomenon is not clear, and is contrary to conventional understanding of lignosulfonates as "sacrificial agents".

The agents used in the afterflush solution are lignosulfonate salts. Lignosulfonates are anionic polyelectrolytes soluble in water and tolerant of hard water (polyvalent ions, e.g. calcium and magnesium). They are also thermally stable in formations where the temperature is high. Lignosulfonates are macromolecules built up by complex condensation of phenyl propane units. The sulfonate groups are attached to the aliphatic side chain, mainly to the alpha carbon. Lignosulfonates are water soluble with molecular weights ranging from several thousand to about 50,000 or more. As mentioned, they are economically attractive since being by-products of the pulping industry, they are plentiful and cost less than the surfactants used in enhanced oil recovery methods.

Lignin is second only to cellulose as the principal constituent in wood. Generally, lignin is a complex phenolic polyether containing many different functional groups including carboxyls, carbonyls, and alcoholic and phenolic hydroxyls. Lignins and their derivatives are described in Kirk-Othmer Encyclopedia of Chemical Technology, Third Edition, Vol. 14, beginning at page 294. This publication describes two very broad classes of lignin derivatives: sulfite lignins and alkali lignins.

The difference in the lignins exists because of the method of extraction of lignin material from woody materials. Sulfonated alkali lignins are readily available commercially from various sources including, but not limited to, West Virginia Pulp and Paper Company under the trade name REAX 80's. Their general method of preparation is described in the Encyclopedia referred to above. Briefly, sulfonated alkali lignins are prepared by cooking woodchips with a 10% solution of a mixture of sodium hydroxide with about 20 mole percent of sodium sulfide. The lignin within wood reacts to form a sodium compound often termed sodium lignate or alkali lignin which is very soluble in the strongly alkaline solution. These alkali lignins are precipated from solution by lowering the pH. These unsulfonated alkali lignins are sold under various trade names, including INDULIN, and are used to prepare the sulfonated derivatives. Methods of sulfonation are known by those skilled in the art. One typical method involves treating the alkali lignins with a solution of alkali sulfites at elevated temperatures and pressure. The degree of sulfonation may be controlled to provide a variety of sulfonated alkali lignins.

The other main type of lignin derivatives are called sulfite lignins or sulfite lignosulfonates. Sulfite lignins are generally made by cooking woodchips under pressure in a solution of sulfurous acid and calcium, magnesium, sodium or ammonium bisulfite. This process converts insoluble lignins to soluble lignosulfonic acid. The lignosulfonic acids (or calcium, magnesium, sodium or ammonium salts of the lignosulfonic acids) are available under various trade names, including MARASPERSE, LIGNOSITE, ORZAN, TORANIL, and RAYFLO.

The broad term lignosulfonates used herein refers to both sulfonated alkali lignins and sulfite lignosulfonates (sulfite lignins). These are distinct types of compounds as explained above. Since the alkali lignins require sulfonation after extraction of the material from woody products it is proper to call them sulfonated alkali lignins. Likewise since sulfite lignins emerge from the extraction process already sulfonated it is proper to refer to this class of materials as sulfite lignins or sulfite lignosulfonates.

Modified sulfonated alkali lignins and sulfite lignosulfonates (such as those with ring sulfomethylation, oxidation, ethoxylation, formaldehyde condensation, phenolation, or carboxylation, and combinations thereof) are also useful in the present invention. Lignosulfonates having degrees of sulfonation from about 2.0 to saturation are acceptable for this invention. Cations which are acceptable include $Na^+$, $K^+$, $NH_4^+$, $Ca^{++}$ and $Mg^{++}$. The degree of sulfonation is the weight percentage of sulfonate ($SO_3^-$) compared to the total molecular weight.

The amount of lignosulfonate salts to be injected into the subterranean formation in an afterflush solution will depend on the particular formation, the area of pattern to be swept and other formation characteristics. Process design data coupled with field experience can determine the exact quantity needed to suitably effectuate this process. Generally, concentrations in the range 1.0 to 3.0 are satisfactory for many formations.

Although it is essential that a lignosulfonate salt be contained in the afterflush, no particular surfactant is required in practicing the invention so long as a surfactant solution is injected into the formation before the lignosulfonate salt solution. Suitable surfactants can be anionic or nonionic in character with particularly applicable surfactants being petroleum and synthetic sulfonates as well as polyoxyalkylated organic material and sulfates or sulfonates thereof. For example, the surfactants applicable in accordance with the present invention can be any of those which are described in the following nonlimiting list of U.S. Pat. Nos.: 3,254,714; 3,301,325; 3,330,344; 3,368,621; 3,455,386; 3,348,611; 3,455,385; 3,455,389; 3,443,635; 3,443,636; 3,406,754; 3,261,399; 3,297,985; 3,480,080; 3,478,823; 3,477,511; 3,469,630; 3,799,263; 3,885,626; 3,977,471; and 4,293,428.

The amount of surfactant which will be injected prior to the lignosulfonate afterflush is generally known in the art. In general, the volume of surfactant solution will range preferably from 0.1 to 1.0 PV, of the reservoir to be treated, with surfactant concentrations of from about 1.0 to about 10.0 percent by weight. The concentration of surfactant is governed primarily by economic considerations.

As mentioned, it is particularly preferred to use microemulsions as the surfactant solution. A microemulsion for use in a specific application will be designed to optimize the amount of oil recovered from a given formation. The microemulsion is formulated on the basis of the physical and chemical characteristics of the subterranean formation to be flooded. Further details on the design and use of microemulsions for enhanced oil recovery are described in U.S. Pat. No. 3,981,361 issued on Sept. 21, 1976 to R. N. Healy, and in an article written by R. N. Healy and R. L. Reed entitled "Immiscible Microemulsion Flooding", *Society of Petroleum Engineers Journal*, pp. 129–139 (1977). Also, other patents describe various applicable microemulsion flooding processes, including those disclosed in the following nonlimiting list of patents: U.S. Pat. Nos. 3,861,466; 3,885,626; 3,885,628; 3,888,308; 3,946,812; 3,977,471; 3,983,940; and 3,994,342.

The afterflush solution may also contain a thickener to enable it to act as a mobility buffer between the surfactant solution and the drive water. Suitable thickeners may include a wide variety of gums, sugars, and various synthetic polymers. Preferable thickeners include water-soluble polymers including polysaccharides, as sold under the trade name "Kelzan XC" by Kelco Corporation as well as Pfizer 1035 biopolymer. High molecular weight polyacrylamides may also be used, more specifically, partially hydrolyzed polyacrylamides as sold under the trade name "Pusher" by Dow Chemical Company.

Also, a preflush solution for adjusting the salinity of the reservoir may be employed but is not necessary for the practice of this invention.

EXPERIMENTAL

In order to demonstrate the beneficial advantages of an afterflush using a solution of lignosulfonate salts, static experiments were performed using Berea sandstone on which a quantity of surfactant had been adsorbed. The results of these experiments are illustrated in FIG. 1. Initially, two samples of Berea sandstone were contacted with a brine solution containing an iso-tridecyl propoxylated, ethoxylated sulfate surfactant. During this initial contact, 1.79 mg surfactant/g rock was adsorbed ($A_1$ & $A_2$).

A portion of the supernatant fluid from the first sample ($A_1$) was removed and replaced by brine. This substitution resulted in additional surfactant adsorption onto the sandstone ($B_1$). Another portion of the supernatant fluid was removed and replaced by brine and more surfactant was adsorbed ($C_1$). This process was repeated until substitution of brine caused no additional adsorption ($D_1$ & $E_1$). At this point surfactant adsorption was 2.35 mg/g rock.

In the second sample ($A_2$), a portion of the supernatant fluid was removed and replaced by brine containing sodium lignosulfonate in an amount 2.5% by weight. This substitution resulted in desorption of some of the surfactant from the sandstone ($B_2$). Repeating this procedure resulted in additional desorption ($C_2$ & $D_2$) until an adsorption level of 0.91 mg surfactant/g rock was reached ($E_2$).

These results indicate that irreducible surfactant concentration in the sandstone is lowered from 2.35 mg/g rock for a brine wash to 0.91 mg/g rock for a lignosulfonate wash. The consequence of this surprising result for an enhanced oil recovery process is that a lignosulfonate afterflush would mobilize otherwise unavailable surfactant for additional oil recovery.

To confirm the advantages of a lignosulfonate afterflush, core floods were run according to the following procedure. Into Berea sandstone cores which were reduced to waterflood oil saturation, surfactant slug was injected. The slug was typically a microemulsion having the following composition: 2.5% surfactant, 4.0% refined oil, and 93.5% 1500 ppm of Flocon 4800 (Xanthamonas biopolymer) in brine solution. Following this surfactant slug, a thickened brine solution was injected with and without lignosulfonate salts. The brine solution was an aqueous solution of inorganic salts in the following proportions: 36130 ppm Sodium; 2840 ppm Calcium; 1210 ppm Magnesium; 63 ppm Barium; 64,220 ppm Chloride; 141 ppm Bicarbonate; and 12 ppm Iron. Flocon 4800 in concentrations of 1500 ppm was used to thicken the solution. Sodium lignosulfonate in an amount 2.5% by weight was added to some of the solutions. Oil recovery from the individual cores was then monitored in order to judge the effects of incorporating lignosulfonate salts within the thickened brine solution. The results of some of these core floods along with others employing lignosulfonates in various other applications are listed in TABLE 1. It can be seen that the residual oil recovered has increased with the use of a lignosulfonate salt solution afterflush.

TABLE I

| Core Flood Oil Recoveries | |
|---|---|
| Process Description | Oil Recovery (% Sor) |
| Unaltered | 52 ± 4* |
| Lignosulfonate Preflush (1PV) | 65 ± 7* |
| Drive with Lignosulfonate | 64 |
| Microemulsion with Lignosulfonate | 44 |

*90% Confidence Regions for New Observations

The principles of the invention and its best mode have been described. It is to be understood that the foregoing is illustrative only and that other means and techniques can be employed without departing from the true scope of the invention defined by the following claims:

What we claim is:

1. A method for recovering crude oil from a subterranean formation having injection and production wells which comprises:
   (a) injecting a surfactant solution into said formation via said injection wells, said surfactant solution being substantially free of lignosulfonate salts;
   (b) injecting as an afterflush an aqueous solution of lignosulfonate salts, said aqueous solution being substantially free of surfactant and said lignosulfonate salts being present in an amount sufficient to reduce retention of surfactant by said formation;
   (c) driving said surfactant and aqueous solutions through said formation with an aqueous drive fluid that is substantially free of surfactant, whereby at least a portion of said crude oil is displaced to said production wells; and
   (d) producing said crude oil via said production wells.

2. A method as described in claim 1 wherein the volume of said surfactant solution is from about 0.1 to about 1.0 PV of said formation.

3. A method as described in claim 2 wherein the concentration of said surfactant solution is from about 1.0 to about 10.0 percent by weight.

4. A method as described in claim 1 wherein said surfactant solution is a microemulsion.

5. A method as described in claim 1 wherein the concentration of said lignosulfonate salt in said afterflush is from about 1.0 to about 3.0 percent by weight.

6. A method as described in claim 1 wherein said aqueous solution contains a thickener.

7. A method for recovering crude oil from a subterranean formation penetrated by an injection well and a production well, which comprises:
   (a) injecting into said formation via said injection well a surfactant-containing liquid for displacing said crude oil, said surfactant-containing liquid being substantially free of lignosulfonate salts;
   (b) subsequently injecting an aqueous solution containing lignosulfonate salts, said aqueous solution being substantially free of surfactant and said lignosulfonate salts being present in an amount sufficient to reduce the retention of surfactant by said formation;
   (c) injecting flooding water to drive said surfactant-containing liquid, aqueous solution, and crude oil through said formation to said production well, said flooding water being substantially free of surfactant; and
   (d) recovering said crude oil via said production well.

8. A method as described in claim 7 wherein the volume of said surfactant-containing liquid is from about 0.1 to about 1.0 PV of said formation.

9. A method as described in claim 8 wherein the concentration of said surfactant-containing liquid is from about 1.0 to about 10.0 percent by weight.

10. A method as described in claim 7 wherein said surfactant-containing liquid is a microemulsion.

11. A method as described in claim 7 wherein the concentration of said lignosulfonate salts is from about 1.0 to about 3.0 percent by weight.

12. A method as described in claim 7 wherein said aqueous solution contains a thickener.

* * * * *